Nov. 15, 1927.  1,649,399
E. W. GARD
APPARATUS FOR SAMPLING OILS
Filed Sept. 19, 1925
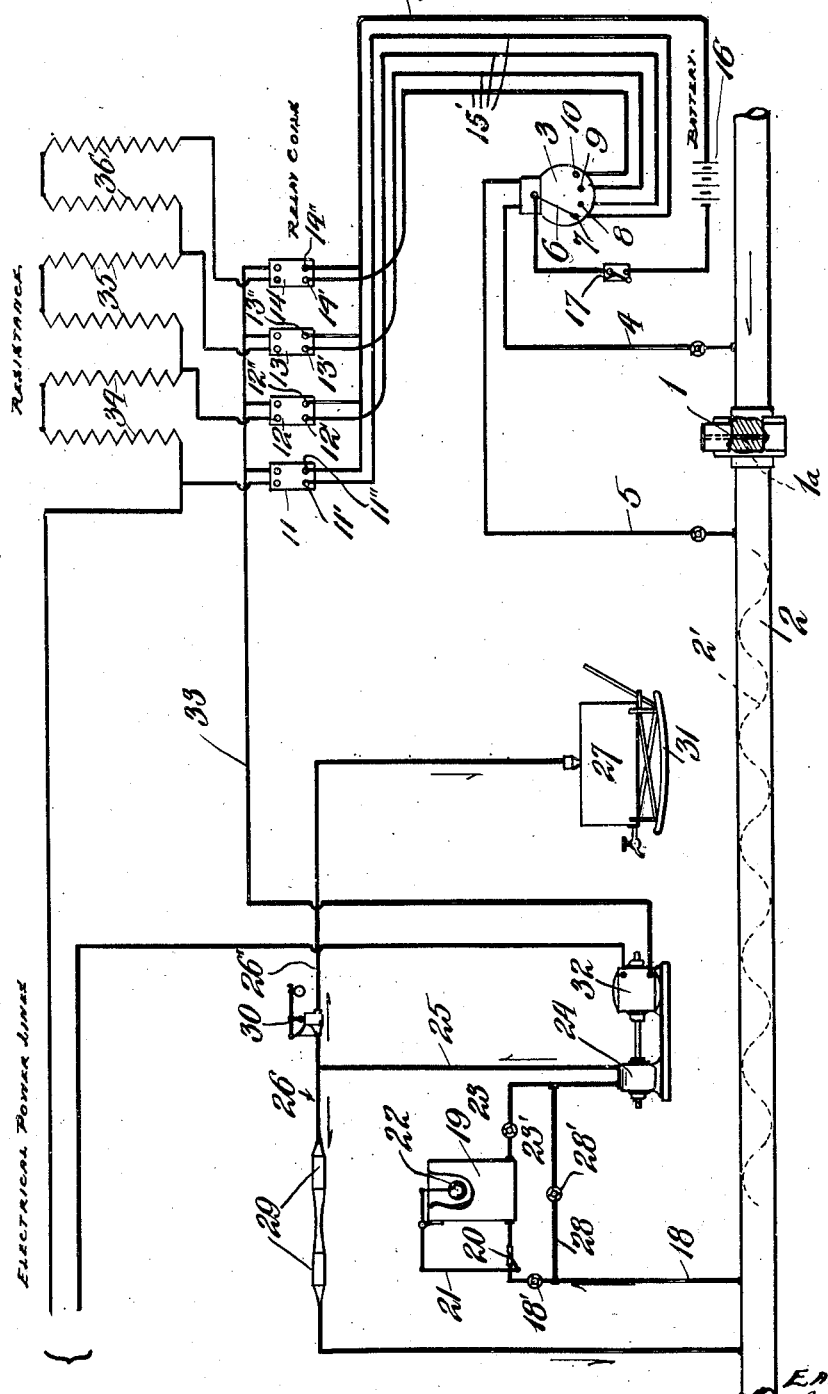

Patented Nov. 15, 1927.

1,649,399

UNITED STATES PATENT OFFICE.

EARLE W. GARD, OF WILMINGTON, CALIFORNIA.

APPARATUS FOR SAMPLING OILS.

Application filed September 19, 1925. Serial No. 57,475.

This invention relates to a system for obtaining samples of fluids, and particularly of oils from a volume flowing through a line, and it relates particularly to a method and means for obtaining from a flowing body of liquid, a sample which will be accurately representative of an average.

The system to be disclosed herein substitutes the unreliable methods now in vogue of "thiefing" the storage tanks or of taking drip samples. Both these methods are inaccurate and by no means represent the average run of oil in a line, because of various conditions of the oil, of the presence of foreign matters, and of water, and of conditions obtaining in the line through which the oil or fluid is conveyed. Unless these conditions are satisfactorily met, and the fluid kept in a state of thorough agitation and mix, it is impossible to ascertain, by the present means, an estimate, by any means, correct or accurate, of the character and nature of the fluid passing through a line.

The object of this invention therefore is to provide a simple system by which a quantity of oil may be removed, at any time from a line, through which the oil is flowing, and which quantity thus removed is accurately representative of the average class and character of oil conveyed through a conduit at any time.

Another object of the invention is to provide a means by which a sample quantity of oil withdrawn from the line conveying it, shall always be proportional to the flow of oil in the line.

Other objects will appear from the specification following in connection with the accompanying drawing which is illustrative of one form in which the invention may be embodied, and the figure of which is a front view showing the co-ordination of the parts composing the system.

My invention comprises in the broader sense, a means for taking from a supply line a quantity of oil and a means governable by the flow in the line for controlling the quantity taken from the line proportionately with the flow, whereby the sample taken from the line is a correct and accurate average of the oil passing through the line.

In the specific sense in which I have preferred to illustrate my system of sampling oils, this invention is shown as embodying a plate 1, having an orifice 1ª, and disposed in the path of flow of a body of oil conveyed through a pipe 2, leading from a convenient source not shown, and under varying pressures. Co-operating with said orifice plate 1, is a differential meter 3 of any approved type, connected to the pipe 2, by lines 4 and 5, the line 4 connected to the pipe 2 on the inlet side of the orifice plate 1, and the line 5 connected to the pipe 2 on the outlet side of the orifice plate 1. The meter 3 is provided with a switch arm 6, which, through mechanism contained in said meter and comprising the usual float resting upon a body of mercury, not shown, is oscillable relative to a plurality of contacts 7—8—9 and 10, which are respectively connected by means of conductors 15' to the terminals 11'—12'—13' and 14' of relays 11—12—13 and 14, the other terminals 11''—12''—13'' and 14'' of which are connected to the switch arm 6 by a conductor 15, which includes a battery 16 or other source of electrical energy and a switch 17, by which the circuit, of which the conductor 15 is a part, may be closed. As the pressures in the line 2 on opposite sides of the orifice plate 1, fluctuate, their differentials will produce a variation of the mercury levels within the meter, causing thereby the float, through its connections, to operate the switch arm 6, which, engaging the contacts 7—8—9 and 10, energizes the respective relay in the circuit closed by the switch arm 6, and effects the purposes hereafter described.

In the pipe line 2 is positioned a device in the form of a helix 2', for agitating the oil passing through the line 2, and thoroughly mixing the ingredients of the oil, which, in many instances, contains water and other foreign fluids and ingredients. Agitation and mixing are therefore necessary to prevent stratification in the line, at that point, at least, from which the oil is abstracted. This agitating device is preferably a flat strip of metal, coiled upon itself to form a helix, and fixedly secured within the pipe line 2, whereby the oil in the line is mixed and agitated when traveling past and in contact with the various convolutions of the coiled strip. To the line 2 is connected a pipe 18, having a valve 18', which leads to the bottom of a tank 19, and serves to conduct a portion of the oil mixture from the pipe 2 into the tank 19, the quantity contained in and delivered to said tank at all times being controlled by a valve 20 on the line 18, which through lever connection 21 is operable by a float 22 in said tank. A pipe 23 having a valve 23' leads from said tank 19 to a pump 24, which, receiving the fluid from the tank 19, delivers the oil mixture through pipe line 25 to lines 26 and 26' respectively through which a portion of the pumped oil is delivered to a drum 27, while the other portion is returned to the pipe line 2. The oil or oil mixture may be delivered from the pipe line 2, directly to the pump 24 by by-passing it from the line 18, into line 28 which connects with the line 23. For this purpose, the valve 18' on line 18, and the valve 23' on line 23 are closed, and the valve 28' on line 28 is opened. In the line 26 is placed a retarding means which may be such as shown in the drawing and comprises an orifice or a Venturi tube 29 which restricts the free flow of the full fluid volume delivered by the pump 24 to the line 26. On the line 26', leading to the tank or drum 27, is an adjustable relief valve 30, which is set to relieve at a given pressure, whereby some oil flows through it at the lowest pump speed into the drum 27. By means of this combination of Venturi tube 29 and relief valve, the increments of oil, whether due to the constant pressure and flow through the line 25, or whether due to variable pressure on the line and caused by acceleration of the pump 24, are relieved through the relief valve 30 and through the line 26' to the drum 27. The minimum flow of oil delivered to the line 26 by the pump, that is, that determinate quantity which passes freely through the Venturi tube 29, is constantly returned to the line 2, but the excess quantity delivered by the pump, which is the increment, operates the relief valve 30 and passes through the line 26' to the drum 27. This drum 27 is preferably mounted upon rockers or a cradle 31, by which the collected oil may be agitated in the drum and thus an accurate average sample of the contents thereof obtained.

The increment of oil removed from the line is directly proportional to the flow, that is to say, the greater or lesser the flow, the greater or lesser will be the sampling increment removed. This proportion is maintained by the pump 24, the operation of which is controlled by a motor 32. This motor 32 is in an electrical circuit 33 which includes a source of electrical power, not shown, a plurality of electrical resistances 34—35 and 36 and the relays 11—12—13 and 14, aforementioned. The relay 11, is directly in the circuit 33. The resistances 34—35 and 36, are in series respectively with the relays 12—13 and 14, which operate to direct the current through the respective resistances 34—35 and 36, or directly, to the motor to regulate the speed of same and also of the pump connected with it. By these resistances 34—35 and 36, the speed of the motor is controlled, and such speed is governed entirely by the flow of the oil through the line 2.

Assuming that the flow of oil through the line 2 is a maximum one, the differential pressures operating upon the switch arm 6, will move said arm 6 into engagement with the contact 7, thereby closing the circuit which includes the relay 11. As a result the relay 11 closes circuit 33 which includes the source of energy and the motor 32, and the electrical current passing unimpeded to the motor 32, the motor is accelerated to its maximum and the pump 24, connected with the motor, also accelerated. By this means, the pump delivers its maximum charge to the line 25, the increment of which charge lifts the relief valve 30 and collects in the drum 27, while the constant flow of the oil is continuously returned to the line 2 through the Venturi tube 29. Where, however, the flow through the line 2, falls to such a point that the pressure differentials are varying, and the contact arm 6, in accordance with such varying pressures, moves into contact with the contacts 8—9 and 10, the relays 12—13 and 14 will be correspondingly energized and the circuit 33 closed by them as a result, with the respective resistances 34—35 and 36 included in such circuit 33. The motor speed and also the speed of the pump 32 is thereby controllably regulated entirely proportional to the flow of oil through the line 2, and it is obvious that the increments of oil passing to the drum 27 are directly proportional to the flow of oil in the line.

The sample thus taken at any time is a true and accurate average sample of the oil passing through the line.

When the resistances 34—35 and 36 are included in the circuit 33, by the operation of the relay 14, it will be seen that the current from the source is cut down and that the speed of the motor and pump connected with it are correspondingly reduced. In this wise, the flow of the oil through the supply line always controls the speed of the motor and the pump, and hence the sample taken at any time is a true and accurate sample of the oil passing through the line, the quantity taken from the line being directly proportional to the quantity passing through the line.

At the end of a run, the drum 27 is agitated in any manner, as by the means illustrated, to wit, rockers 31, whereby the collected quantity of liquid is thoroughly mixed, and a quantity removed from the drum is accurately representative of the average class, character and constitution of the oil which has passed through the main line, in a given time.

What I claim, is:

1. Means for sampling oils passing through a supply line, comprising said supply line, a mixing device contained in said supply line, a float chamber, means connecting the same to said supply line to receive a portion of the oil therefrom, a drum, a pipe connected with the drum and with the supply line, a pump, connections thereto whereby it is adapted to remove the oil from said float chamber and deliver it to said pipe, means to retard the flow of oil through said pipe to the supply line to cause a portion of the oil to pass through said pipe to said drum, and means controlled by the flow of oil through said supply line to regulate the pump so that the speed thereof will be proportional to such flow.

2. A means for obtaining samples of oils passing through a supply line, comprising said supply line, a means for agitating the oil within said supply line, a float chamber, means connecting same to said supply line to receive a portion of the oil therefrom, a drum, a pipe connected with the drum and with said supply line, a pump, means connecting the same to said float chamber and means connecting the same to said pipe, a relief valve in said pipe to cause a portion of oil to pass through said pipe to said drum, and means controlled by the flow of oil through said supply line to regulate the pump so that the speed thereof will be proportional to such flow.

3. In a device for sampling oils, in combination with a supply line, an agitator in said line, a drum, a pipe connecting with said drum and with said supply line, a pump, means connecting said pump to said supply line and means connecting the same to said pipe, means to retard the flow of oil through said pipe back into said line, a relief valve to cause a portion of oil pumped into said pipe to pass to said drum, and means to operate said pump, comprising a motor, an electrical circuit including said motor, a plurality of resistances and a corresponding plurality of relays, a second electrical circuit including a battery, said relays, a plurality of contacts and a switch arm, means operated by pressure differentials in the supply line for operating said switch arm relative to said contacts to control the relays and thereby the speed of the pump proportionately with the flow of oil through said supply line, and connections from the supply line for communicating such differentials to said means.

4. In a device for sampling oils, in combination with a supply line, an orifice plate in said line, a differential pressure operating means, means whereby the same is connected to said line at opposite sides of the orifice plate, a switch arm controlled by said pressure operated means, contacts over which said arm is movable; a plurality of relays, a battery circuit, including the switch arm, contacts and relays, a switch in said battery circuit, a plurality of resistances in series with said relays, an electric motor, a power circuit, including said resistances, relays and motor, a float controlled chamber connected to said supply line, a drum, a pipe line connecting with said drum and said supply line, a pump operated by said motor and means connecting said pump to said pipe line and float chamber, said pipe line having a means for retarding the flow of oil back to the supply line, and a means for causing a portion of the oil pumped to pass to the drum.

5. A means for sampling oils passing through a supply line comprising said supply line, a chamber, means connecting the chamber with the supply line, means for controlling the flow of oil to said chamber, a drum, a pipe connecting with said drum and said supply line, a pump, connections thereto whereby it is adapted to remove the oil from said chamber and deliver it to said pipe, a motor to operate said pump, said pipe adapted to return most of the oil pumped back to the supply line and to conduct the remainder to said drum, an electrical circuit including said motor and means operable by the flow of oil through said supply line to control the passage of current to said electrical circuit and thereby regulate the motor so that the speed thereof will be proportional to such flow.

6. A means for sampling oils passing through a supply line, comprising said supply line, a drum, a pipe connected to said drum and to said supply line, a pump means connecting the same to said supply line and means connecting the same to said pipe and adapted to convey a portion of the oil in said supply line to said pipe, means in said pipe to control the flow of a portion of the oil pumped to said drum, a motor to operate said pump, means operated by pressure differentials in said supply line to regulate said motor and pump so that the speed thereof will be proportional to the flow of oil through said supply line, and connections from the supply line for communicating such differentials to said means.

7. Means for obtaining average samples of oil passing through a supply line comprising said supply line, a tank into which the samples of oil are to be delivered, a pipe connected with said tank and supply line, a pump, means connecting the same to said supply line and means connecting the same to said pipe to deliver a portion of the oil from said supply line to said pipe, said pipe arranged to return most of the oil pumped back to the supply line and conduct the remainder to said tank, means to create pressure differentials in said supply line, means to operate said pump and means controlled by said differentials to regulate the speed of said operating means in proportion to the flow of oil through said supply line, and connections from said supply line for communicating said pressure differentials to said means.

8. A means for obtaining accurate average samples of fluids passing through a supply line, comprising said supply line, a tank into which samples of fluid are to be delivered, a pipe connected to said tank and supply line, a pump, means connecting same to said supply line and means connecting same to said pipe and adapted to deliver a portion of the oil from said supply line to said pipe, means in said pipe to control the flow of a portion of the oil pumped to said tank, operating means for said pump, means operated by pressure differentials in said supply line to regulate said operating means and pump so that the speed thereof will be proportional to the flow through said supply line, and connections from the supply line for communicating the pressure differentials to said means.

9. A means for obtaining accurate average samples of fluids passing through a supply line, comprising said supply line, a means in said line for agitating the fluid, a tank, a pipe connected with said tank and supply line, a pump, means connecting same to said supply line and means connecting same to said pipe, means to operate said pump, said pipe adapted to return most of the fluid pumped back to said supply line, the remainder going to said tank.

10. A means for obtaining average samples of fluids passing through a supply line comprising said supply line, a means in said line for agitating the fluid, a tank, a pipe conencted with said tank and said supply line, a pump, means connecting said pump with said supply line means connecting the pump with said pipe, said pipe arranged to return most of the fluid pumped back to said supply line, the remainder going to said tank, a motor to operate said pump, a plurality of resistances to control the current flow to said motor, an electrical power circuit including said motor and resistances, means operated by pressure differentials in said supply line to control the passage of current to said resistances thereby to regulate the operation of said pump proportionately with the flow in said supply line and connections from the supply line for communicating such pressure differentials to said means.

11. Means for obtaining samples of fluids passing through a supply line comprising said supply line, a tank, a pipe connected with said tank and said supply line, a pump, means connecting said pump with said supply line and means connecting said pump with said pipe, said pipe arranged to return most of the fluid pumped back to said supply line, the remainder going to said tank, means to regulate the volume of fluid going to said tank, a motor to operate said pump, a plurality of resistances to control the flow of current to said motor, an electrical power circuit including said motor and resistances, means connected to said supply line to create pressure differentials, means operable by said pressure differentials to control the passage of current to said resistances and thereby regulate the speed of the pump in proportion to the flow of fluid through said supply line, and connections from the supply line for communicating the pressure differentials to said means.

In testimony whereof I have set my hand.

EARLE W. GARD.